Patented Jan. 31, 1950

2,496,163

UNITED STATES PATENT OFFICE 2,496,163

SYNTHESIS OF A 2-SUBSTITUTED-5-OXOPYRROLIDINE

Henning Waldemar Jacobson, Wilmington, Del., assignor to E. I. du Pont de Nemours & Company, Wilmington, Del., a corporation of Delaware No Drawing. Application March 30, 1948, Serial No. 18,069

10 Claims. (Cl. 260—313)

This invention relates to new organic chemical compounds and more particularly to pyrrolidine compounds, i. e., compounds containing a saturated ring of four carbons and one nitrogen, as follows:

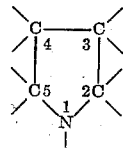

This invention has as an object the preparation of new pyrrolidine compounds. A further object is the provision of a new process for the preparation of pyrrolidine compounds. Other objects will appear hereinafter.

These objects are accomplished by the invention wherein an ammonium or primary monoamine salt of a carboxylic acid containing four carbon atoms in a chain joining the carboxyl carbon of the acid to an activating radical such as carboxyl, carbonamido, or carbalkoxy, said chain of four carbon atoms containing as the only carbon to carbon unsaturation, one ethylenic double bond in the beta or gamma position relative to the above-first-mentioned carboxyl group and having, apart from hydrogen, only hydrocarbon substituents is heated at 100–250° C. and the 2-substituted-5-oxopyrrolidine is isolated. The invention also includes as new compounds 1-substituted-5-oxo-2-pyrrolidineacetic acids, their esters and amides wherein the substituent in position 1 is a monovalent hydrocarbon radical of 4–18 carbons, i. e., 2-substituted-5-oxopyrrolidines of the formula

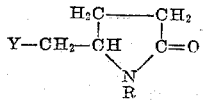

wherein Y is carboxyl or a neutral group which upon hydrolysis is converted to a carboxyl group with the formation of no additional acidic product and R is a monovalent hydrocarbon radical of from 4–18 carbons.

The substituent on the nitrogen (position 1 in the pyrrolidine ring) in the novel products of this invention is the monovalent radical of the primary monoamine from which the salt was prepared. The substituent in position 2 of the 5-oxopyrrolidine ring is the carbon atom, carrying the activating group, of the acid, from which the salt was made, with its substituents including the activating group. These points are illustrated by the following equation:

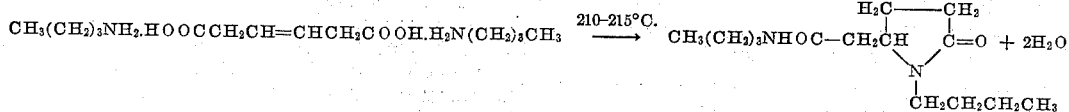

The following examples in which parts are by weight are illustrative of the invention.

EXAMPLE I

N,1-DIBUTYL-5-OXO-2-PYRROLIDINEACETAMIDE (a) *Preparation of bis(n-butylammonium) beta-hydromuconate*

A solution of 20.3 parts of n-butylamine in 48 parts of absolute alcohol was added to a solution of 20 parts of beta-hydromuconic acid in 160 parts of absolute alcohol. The alcohol was evaporated from the resulting solution and the product washed with ether and dried in a desiccator. There was obtained 36 parts (90% of theoretical) of bis(n-butylammonium) beta-hydromuconate.

(b) *Conversion of bis(n-butylammonium) beta-hydromuconate to N,1-dibutyl-5-oxo-2-pyrrolidineacetamide*

Forty-eight (48) parts of bis(n-butylammonium) beta-hydromuconate was heated for three hours in a closed glass reactor at a temperature of 210–215° C. The reactor was allowed to cool to room temperature, opened to the atmosphere and the product dissolved in methanol, dried over anhydrous magnesium sulfate and finally purified by distillation. There was obtained a substantially quantitative yield of N,1-dibutyl-5-oxo-2-pyrrolidineacetamide, a viscous yellow oil boiling at 210–212° C./2 mm. and soluble in dilute hydrochloric acid, but insoluble in dilute alkali.

By way of comparison the linear diamide, N, N'-dibutyl-beta-hydromuconamide, of the same empirical formula, which was prepared by the reaction between the acid chloride of beta-hydromuconic acid and n-butylamine, is a solid crystalline material melting at 167 to 168° C., insoluble in 10% hydrochloric acid and also in 1N sodium hydroxide solution.

EXAMPLE II

N,1-DIALLYL-5-OXO-2-PYRROLIDINEACETAMIDE (a) *Preparation of bis(allylammonium) beta-hydromuconate*

A solution of 26.5 parts of allylamine in 40 parts of absolute alcohol was added to a solution of 33.5 parts of beta-hydromuconic acid in 240 parts of hot absolute alcohol. The alcohol was evaporated from the resulting solution and the residue thus obtained washed with ether and dried to give 49 parts (81% of theoretical) of bis(allylammonium) beta-hydromuconate melting at 73–75° C.

(b) *Conversion of bis(allylammonium) beta-hydromuconate to N,1-diallyl-5-oxo-2-pyrrolidineacteamide*

Forty-eight (48) parts of bis(allylammonium) beta-hydromuconate was heated in a closed reactor for two hours at 210–215° C., the reactor allowed to cool to room temperature and then opened to the atmosphere. The product was dissolved in methanol, dried over anhydrous magnesium sulfate and finally purified by distillation. There was obtained 38 parts (92% of theoretical) of N,1-diallyl-5-oxo-2-pyrrolidineacetamide, boiling at 184–185° C./1 mm.

EXAMPLE III

N,1-DIOCTADECYL-5-OXO-2-PYRROLIDINEACETAMIDE (a) *Preparation of bis(octadecylammonium) beta-hydromuconate*

A solution of 12.7 parts of beta-hydromuconic acid in 120 parts of absolute alcohol was added to a hot solution of 43.7 parts of octadecylamine in 240 parts of absolute alcohol. The solution was allowed to cool to room temperature and the precipitated product removed by filtration. There was obtained 47 parts (77% of theoretical) of solid bis(octadecylammonium) beta-hydromuconate melting at 90–94° C.

(b) *Conversion of bis(octadecylammonium) beta-hydromuconate to N,1-dioctadecyl-5-oxo-2-pyrrolidineacetamide*

Forty-five (45) parts of bis(octadecylammonium) beta-hydromuconate was heated at 225–230° C. in a closed reactor for three hours, the reactor allowed to cool to room temperature, opened to the atmosphere and the product removed. After recrystallization from alcohol and drying of the resultant solid, there was obtained 38 parts (89.5% of theoretical) of N,1-dioctadecyl-5-oxo-2-pyrrolidineacetamide melting at 71.0–72.5° C.

Anaylsis: Calculated for $C_{42}H_{82}O_2N_2$: C, 78.0%; H, 12.7%. Found: C, 78.0%; H, 12.7%.

EXAMPLE IV 1-(n-BUTYL)-5-OXO-2-PYRROLIDINEACETIC ACID

A mixture of 28.8 parts of beta-hydromuconic acid and 14.6 parts of n-butylamine was heated in a closed reactor at 205–210° C. for two hours. The reactor was allowed to cool to room temperature, opened to the atmosphere and the product removed. This clear, viscous, acidic, water-soluble, liquid product was dissolved in methanol, the resutling solution dried over anhydrous calcium sulfate and finally purified by distillation. There was obtained a substantially quantitative yields of 1-(n-butyl)-5-oxo-2-pyrrolidineacetic acid boiling at 188–190° C./0.5 mm.

Analysis calculated for $C_{10}H_{17}O_3N$: neutral equivalent 199.0. Found: neutral equivalent, 199.9.

This reaction may also be carried out with monoesters and monoamides of the dibasic acids operable in the process of this invention. For instance, 5-carbethoxy-3-pentenoic acid and 5-carbamyl-3-pentenoic acid may be used to give, respectively, under the above reaction conditions ethyl 1-(n-butyl)-5-oxo-2-pyrrolidineacetate and 1-(n-butyl)-5-oxo-2-pyrrolidineacetamide.

EXAMPLE V

5-OXO-2-PYRROLIDINEACETAMIDE (a) *Preparation of diammonium beta-hydromuconate*

Sixty (60) parts of beta-hydromuconic acid was dissolved in 180 parts of concentrated ammonium hydroxide and the resulting solution evaporated to dryness on a steam bath. There was obtained 62 parts (91% of theoretical) of white crystalline diammonium beta-hydromuconate.

(b) *Conversion of diammonium beta-hydromuconate to 5-oxo-2-pyrrolidineacetamide*

Fifty (50) parts of diammonium beta-hydromuconate was heated at 215–220° C. in a closed reactor for three hours, the reactor allowed to cool to room temperature, opened to the atmosphere and the water removed from the residue under reduced pressure. The viscous liquid product remaining was extracted with 900 parts of hot ethyl acetate from which upon cooling there was obtained 5 parts of white, crystalline material. After recrystallization from ethyl acetate, there was obtained 4.5 parts of 5-oxo-2-pyrrolidineacetamide melting at 147–148° C., soluble in water, slightly soluble in ethyl acetate and insoluble in ether.

Analysis: Calculated for $C_6H_{10}N_2O_2$: C, 50.7%; H, 7.0%; N, 19.8%. Found: C, 50.6%; H, 7.0%; N, 19.8%

EXAMPLE VI

A mixture of 26.2 parts of beta-hydromuconic acid and 33.8 parts of aniline was heated at 110° C. in a closed reactor for 20 minutes. At the end of this time, the temperature was raised to 210° C. and maintained at that level for a period of one hour. The reactor was then allowed to cool to room temperature, opened to the atmosphere and the solid product removed. There was obtained a substantially quantitative yield of N,1-diphenyl-5-oxo-2-pyrrolidineacetamide in the form of a white solid melting with decomposition at 225–230° C. and insoluble in benzene and ether but slightly soluble in alcohol and dioxane.

Analysis: Calculated for $C_{18}H_{18}N_2O_2$: C, 73.5%; H, 6.1%. Found: C, 73.1%; H, 6.5%.

The linear unsaturated dianilide, N,N'-diphenyl-beta-hydromuconamide, of the same empirical formula, was prepared from the acid chloride of beta-hydromuconic acid and aniline. There was obtained a light tan colored, solid compound melting, with decomposition at 255–260° C. insoluble in ethanol, very slightly soluble in dioxane and analyzing for C, 73.1%; H, 6.2%.

The salts used in the process of this invention can be made from ammonia and monoamines containing two amino hydrogens, i. e., primary monoamines. Primary monoamines useful in the process of the invention include, in addition to those already described, saturated aliphatic primary monoamines, e. g., methylamine, amylamine and octadecylamine; unsaturated aliphatic primary monoamines, e. g., methallylamine and oleylamine; aromatic-aliphatic primary monoamines, e. g., 2-phenylethylamine and 2-phenyl-2-methylpropylamine; aromatic primary monoamines, e. g., p-methylaniline and beta-naphthylamine; cycloaliphatic primary monoamines, e. g., cyclohexylamine and 2-aminodecahydronaphthalene; substituted aliphatic primary monoamines, e. g., 2-chloroethylamine, 4-ethoxybutylamine, 4-phenoxybutylamine and ethanolamine; substituted aromatic-aliphatic primary monoamines, e. g., 2-(4-chlorophenyl)-ethylamine and 2-(4-nitrophenyl)ethylamine; substituted aromatic primary monoamines, e. g., 3-choloraniline and 2,5-diethyl aniline; substituted cycloaliphatic primary monoamines, e. g., 4-nitrocyclohexylamine and 1-methylcyclohexylamine; etc.

Preferred for reasons of lack of complicating factors in the reaction are: monoamines containing two amino hydrogens, i. e., primary monoamines, which apart from amino nitrogen and hydrogen thereon are hydrocarbon. Especially preferred because of the higher purity possible through simple purification of the intermediate salt formed at low temperatures are primary monoamines which apart from amino nitrogen and hydrogen thereon are aliphatic, i. e., aliphatic primary monoamines.

At times it is desirable, for convenience or for shortened overall time of reaction, to carry out the process in the one-stage manner shown in Examples IV and VI wherein the amine and acid, particularly beta-hydromuconic acid, are heated together without prior formation of the amine salt, the amine salt being formed in situ. This one-stage method is useful with ammonia and primary aliphatic amines, but is particularly appropriate in the case of primary aromatic amines since aromatic amines do not form salts with carboxylic acids in the low temperature range of aliphatic amine salt formation, and must, therefore, be heated to relatively high temperatures with the carboxylic acids to carry out salt formation. It is therefore preferred to prepare a 2-substituted-5-oxopyrrolidine carrying an aromatic residue in the 1 position in a one-stage process by heating the desired monoethylenically unsaturated carboxylic acid with substantially equivalent proportions of the required primary aromatic amine at temperatures sufficiently high to produce the desired 5-oxopyrrolidine directly without isolation of the aromatic amine salt of the carboxylic acid.

The salts used in the process of this invention can be made from carboxylic acids defined by the following type formulas:

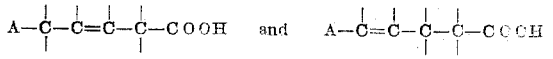

where A is carboxyl or a neutral group which upon hydrolysis is converted to a carboxyl group with the formation of no additional acidic product and the unfilled valences of the carbon atoms in the chain joining the carboxyl group to the activating group are filled by hydrogen or lower monovalent saturated aliphatic hydrocarbon radicals. Examples of such groups are: the carboxyl group (—COOH), the carbamyl group (—CONH$_2$), a carbonamide group (—CONHR' and —CONR'R'') wherein R' and R'' may be aliphatic hydrocarbon, substituted aliphatic hydrocarbon, aromatic hydrocarbon, substituted aromatic hydrocarbon, cycloaliphatic hydrocarbon or substituted cycloaliphatic hydrocarbon, or a carboxylic acid ester group (—COOR' wherein R' is as defined above). It will be noted that A is either carboxyl or a neutral group which upon hydrolysis is converted to a carboxyl group with the formation of no additional acidic product.

Specific acids useful in this invention are: 3-hexene-1,6-dioic acid, 2-hexene-1,6-dioic acid, 5-carbethoxy-4-pentenoic acid, 5-carbethoxy-3-pentenoic acid, 5-carbamyl-4-pentenoic acid, 5-carbamyl-3-pentenoic acid, 6-(N-butylamido)-3-hexenoic acid and 6-(N-methyl,N-propylamido)-2-hexeneoic acid.

The monoesters may be prepared by the method of "Organic Syntheses" collected vol. II, page 276, 277 as follows: 1 mole of the free acid is dissolved in 38.5 parts of di-n-butyl ether containing 30 parts of concentrated hydrochloric acid. Approximately 0.6 of a mole of the di-ester of the same acid whose monoester is desired (the ester groups being the same) is added. The mixture is heated at 160°–170° C. until homogeneous and then the temperature is lowered to 120–130° C. and one mole of the alcohol corresponding to the ester is added. The reaction mixture is refluxed for 2 hours and then fractionated to give the following products: (1) the alcohol, water and dibutyl ether, (2) the di-ester and (3) the monoester.

The monoester can be converted to the monoamide or substituted monoamide by reacting the monoester with thionyl chloride to form the acid chloride of the monoester, subsequently reacting this compound with ammonia or the appropriate amine to form the monoester-monoaminde or monoester-substituted-monoamide which upon alkaline hydrolysis followed by acidification produces the desired monoamide or substituted monoamide.

In the case of the dicarboxylic acids useful in this invention (i. e., where the activating group is carboxyl) primary monoamine salts of only one carboxyl group may, if desired, be prepared from which are produced by the process of this invention 5-oxo-2-pyrrolidineacetic acids carrying in the 1 position the monovalent radical of the primary monoamine from which the salt was prepared.

The process of this invention may be carried out in the range of 100–250° C. For reasons of increased yield, it is preferred to carry out the pyrolysis at temperatures in the range 150 to 250° C., but always below the decomposition point of the desired 5-oxopyrrolidines. For reasons of lack of discoloration in the final products and for concomitant ease of purification, it is preferred to carry out the process of this invention in a system protected from the atmosphere, i. e., a closed system or one under nitrogen. In the process of purification of the desired 5-oxopyrrolidines, it is preferred for reasons of improved yields and improved quality of the product to remove the reaction residue from the reaction vessel with an inert solvent such as ethanol, methanol, acetone or dioxane and to dry the resultant solution of the product in said solvent prior to purification.

The new class of 5-oxopyrrolidines of this invention is defined by the following type formula

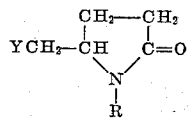

where Y is carboxyl or a neutral group, which upon hydrolysis is converted to a carboxyl group with the formation of no additional acidic product, and R is a monovalent hydrocarbon radical containing from 4 to 18 carbons. Preferred for reasons of ease of preparation are the 5-oxopyrrolidines defined by the above formula where Y is —COOH, —CONH$_2$, CONHR', —CONR'R' or —COOR' and R' is a monovalent hydrocarbon radical of one to eighteen carbons.

The products of this invention exhibit low vapor pressures at room temperature and are essentially odorless. They vary from high boiling, viscous liquids to high melting, non-distillable white solids and are stable at temperatures as high as 275–300° C. Their solubility decreases with increasing molecular weight and ranges from good in lower aliphatic alcohols and moderate in water for the lower molecular weight range of the series to fair and insoluble, respectively, for the higher members of the series. They generally exhibit weakly alkaline properties and are soluble in dilute acid and insoluble in dilute alkali.

One use of the products of this invention is as intermediates for the preparation of other compounds. For example, the 1-substituted-5-oxo-2-pyrrolidineacetic acids may be converted to the corresponding acid chlorides which may in turn be used to prepare other 5-oxopyrrolidine derivatives.

The 2-substituted-5-oxopyrrolidines per se may be used as plant growth regulants, pesticides, as intermediates in the preparation of pharmaceutically active materials or, in the case of long-chain aliphatically substituted 5-oxopyrrolidines (e. g., N,1-dioctadecyl-5-oxo-2-pyrrolidineacetamide) as surface-active agents.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process for the preparation of a 2-substituted-5-oxopyrrolidine of the formula

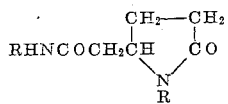

where R is an alkyl radical which comprises heating the neutral beta-hydromuconate of a primary alkylamine at a temperature within the range 150° C. to 250° C. but below the temperature of decomposition of the pyrrolidine and removing the 2-substituted-5-oxopyrrolidine formed.

2. Process for the preparation of a 2-substituted-5-oxopyrrolidine which comprises heating a beta-hydromuconate of a primary alkylamine RNH₂ wherein R is an alkyl radical at a temperature within the range 100–250° C. but below the temperature at which the pyrrolidine decomposes and removing the 2-substituted-5-oxopyrrolidine formed.

3. Process of claim 2 wherein the salt is formed in situ.

4. Process for the preparation of a 2-substituted-5-oxopyrrolidine which comprises heating a beta-hydromuconate of a primary aliphatic monoamine RNH₂ wherein R is a monovalent aliphatic hydrocarbon radical at a temperature within the range 100–250° C. but below the temperature at which the 2-substituted-5-oxopyrrolidine decomposes and removing the 2-substituted-5-oxopyrrolidine formed.

5. Process for the preparation of a 2-substituted-5-oxopyrrolidine of the formula

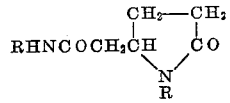

wherein R is a monovalent aliphatic hydrocarbon radical which comprises heating the neutral beta-hydromuconate of a primary aliphatic monoamine RNH₂ wherein R is a monovalent aliphatic hydrocarbon radical at a temperature within the range 100–250° C. but below the temperature at which the 2-substituted-5-oxopyrrolidine decomposes and removing the 2-substituted-5-oxopyrrolidine formed.

6. Process for the preparation of a 2-substituted-5-oxopyrrolidine of the formula

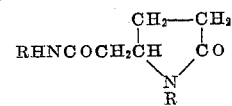

wherein R is a monovalent hydrocarbon radical which comprises heating the neutral beta-hydromuconate of a primary monoamine RNH₂ wherein R is a monovalent hydrocarbon radical at a temperature within the range 100–250° C. but below the temperature at which the 2-substituted-5-oxopyrrolidine decomposes and removing the 2-substituted-5-oxopyrrolidine formed.

7. Process of claim 6 wherein the primary amine has from four to eighteen carbon atoms.

8. Process for the preparation of a 2-substituted-5-oxopyrrolidine which comprises heating a beta-hydromuconate of a primary monoamine at a temperature within the range of 100–250° C. but below the temperature at which the 2-substituted-5-oxopyrrolidine decomposes and removing the 2-substituted-5-oxopyrrolidine.

9. Process for the preparation of heterocyclic compounds which comprises heating a primary amine salt of a dicarboxylic acid having a chain of four carbon atoms between the carboxyls, said chain having but one unsaturation and that an ethylenic double bond, at a temperature within the range 100–250° C. but below the decomposition temperature of the heterocyclic organic product.

10. Process for the preparation of heterocyclic compounds which comprises heating a salt of a nitrogen compound of the class consisting of ammonia and primary monoamines, said salt having as its acid component a carboxylic acid having its carboxyl separated from an activating radical of the class consisting of carboxyl and neutral groups which upon hydrolysis are converted to carboxyl groups with the formation of no additional acidic products by a chain of four carbons having as the only carbon to carbon unsaturation an ethylenic double bond at least once removed from the carbon of the first-named carboxyl, the heating being at a temperature within the range of 100–250° C. but below the decomposition point of the heterocyclic organic product.

HENNING WALDEMAR JACOBSON.

REFERENCES CITED

The following references are of record in the file of this patent:

Hollins, "The Synthesis of Nitrogen Ring Compounds," Van Nostrand, New York, (1924), page 69.

Beilstein, Vierte Auflage, vol. 22, pp. 287–292 (1935).